Figure 1:
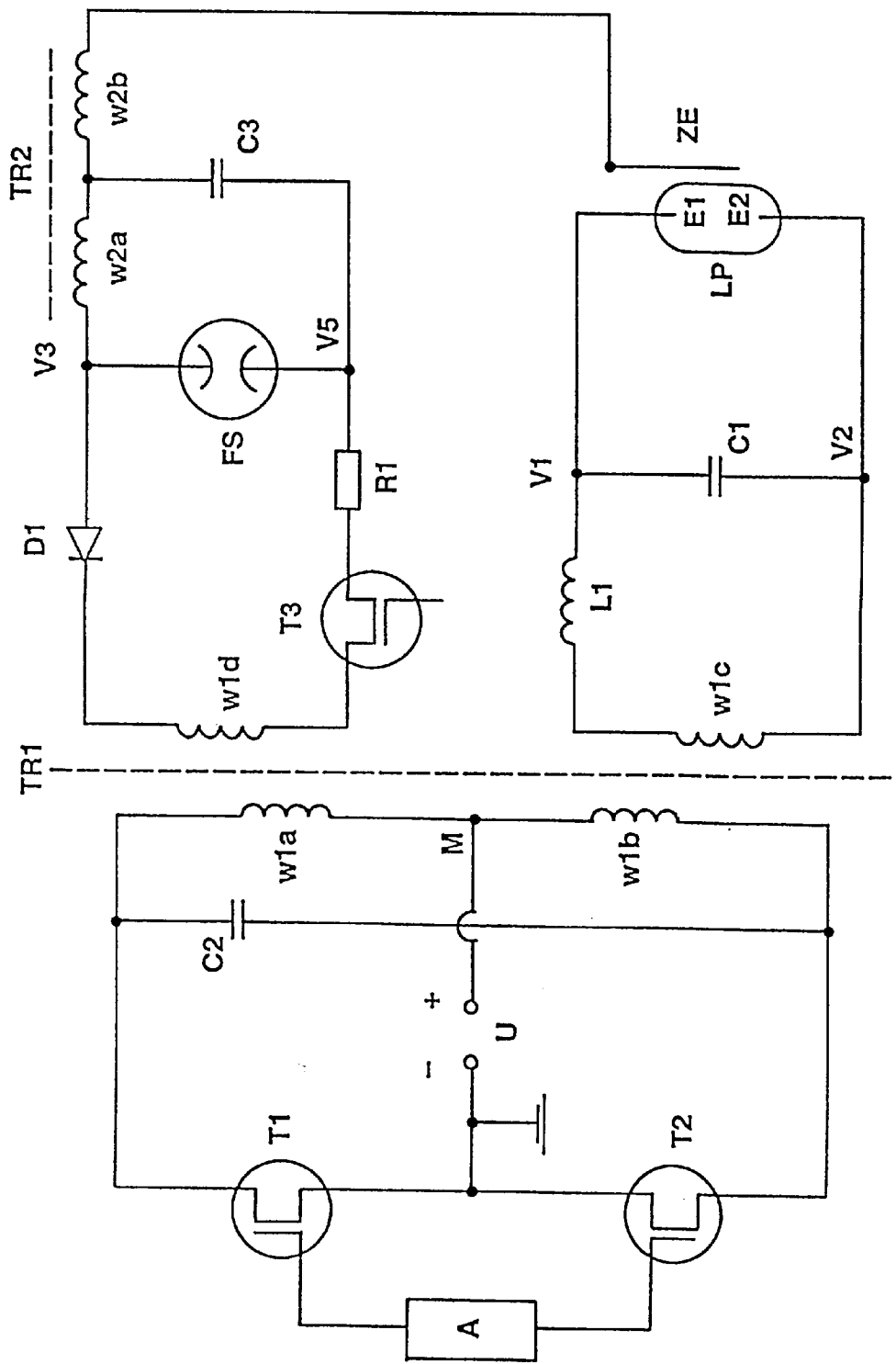

United States Patent [19]
Hirschmann et al.

[11] Patent Number: 5,990,633
[45] Date of Patent: Nov. 23, 1999

[54] HIGH-PRESSURE DISCHARGE LAMP HAVING DECOUPLED IGNITION AND LOAD CIRCUITS

[75] Inventors: Guenther Hirschmann, Munich; Stefan Mueller, Esslingen; Matthias Mengele; Christian Wittig, both of Munich; Bernd Lewandowski, Feldafing, all of Germany

[73] Assignee: Patent-Treuhand-Gessellschaft fur elektrische Gluehlampen mbH, Munich, Germany

[21] Appl. No.: 09/091,624

[22] PCT Filed: Oct. 2, 1997

[86] PCT No.: PCT/DE97/02271

§ 371 Date: Jun. 22, 1998

§ 102(e) Date: Jun. 22, 1998

[87] PCT Pub. No.: WO98/18297

PCT Pub. Date: Apr. 30, 1998

[30] Foreign Application Priority Data

Oct. 23, 1996 [DE] Germany ............... 196 44 115

[51] Int. Cl.[6] .................................................. H05B 37/02
[52] U.S. Cl. ..................... 315/289; 315/290; 315/291; 315/278
[58] Field of Search ................................. 313/594, 601, 313/602, 570, 571; 315/218, DIG. 7, 291, 307, 289, 290, 246, 278

[56] References Cited

U.S. PATENT DOCUMENTS

| | | |
|---|---|---|
| 2,923,856 | 2/1960 | Greene et al. ............... 315/DIG. 7 |
| 2,982,881 | 5/1961 | Reich .............................. 315/219 |
| 3,868,525 | 2/1975 | Waymouth et al. .............. 313/571 |
| 4,065,370 | 12/1977 | Noble et al. ..................... 313/594 |
| 4,353,116 | 10/1982 | Palmers et al. .................. 315/219 |
| 4,535,271 | 8/1985 | Holmes ........................... 315/219 |
| 4,724,361 | 2/1988 | Wada et al. ..................... 315/246 |
| 4,769,578 | 9/1988 | Jacobs et al. . |
| 5,036,256 | 7/1991 | Garrison et al. . |

FOREIGN PATENT DOCUMENTS

| | | |
|---|---|---|
| 0294604 | 12/1988 | European Pat. Off. . |
| 0294605 | 12/1988 | European Pat. Off. . |
| 0567408 | 10/1993 | European Pat. Off. . |
| 0696046 | 2/1996 | European Pat. Off. . |

*Primary Examiner*—Michael B Shingleton
*Attorney, Agent, or Firm*—Carlo S. Bessone

[57] ABSTRACT

The invention relates to circuitry for the operation of a high-pressure discharge lamp including a voltage transformer (T1, T2), preferably a push-pull transformer, a transformer (TR1) connected to the output of the voltage transformer (T1, T2), a pulse ignition device, and a load circuit designed as a ocrial resonance circuit (L1, C1) into which the high-pressure discharge lamp (LP) is switched. The transformer (TR1) possesses at least two secondary windings (w1c, w1d), wherein the first secondary winding (w1c) switches into the load circuit and the second secondary winding (w1d) is connected to the pulse ignition device at the voltage input. The ignition voltage output of the pulse ignition device is designed to be connected to an auxiliary ignition electrode (ZE) of the high-pressure discharge lamp (LP).

30 Claims, 3 Drawing Sheets

HIGH-PRESSURE DISCHARGE LAMP HAVING DECOUPLED IGNITION AND LOAD CIRCUITS

Circuit arrangement for operating a high-pressure discharge lamp as well as illumination system with a high-pressure discharge lamp and an operating device for the high-pressure discharge lamp The invention relates to a circuit arrangement for operating a high-pressure discharge lamp according to the preamble of Patent claim 1 as well as an illumination system with a high-pressure discharge lamp and an operating device for the high-pressure discharge lamp.

TECHNICAL FIELD

In particular, the invention relates to a circuit arrangement for operating a low-wattage high-pressure halogen metal-vapour discharge lamp which is used for example in motor vehicle headlights and whose rated power is typically approximately 35 watts, as well as an illumination system comprising a low-wattage high-pressure halogen metal-vapour discharge lamp and an operating device coordinated therewith.

The high-pressure discharge lamp has a discharge vessel made of quartz glass which is closed off in a gas-type manner by means of molybdenum foil seals and is surrounded by an outer bulb. Two gas discharge electrodes project into the discharge space and are electrically conductively connected to external power supply leads via the molybdenum foil seals. The ionizable filling enclosed in the discharge space of this lamp is composed of xenon and metal halides.

The operating device, or the circuit arrangement accommodated in the operating device, for operating a high-pressure discharge lamp used in a motor vehicle headlight is usually supplied with electrical energy by the on-board electrical system of the motor vehicle. That is to say that the circuit arrangement is fed with a DC voltage of typically 12 V or 24 V by a low-voltage voltage source. With the aid of the circuit arrangement, this DC voltage supplied by the on-board electrical system must be stepped up so that it corresponds to the requirements necessary for lamp operation. For example, an ignition voltage of a few kilovolts is required to ignite the high-pressure discharge lamp in the cold state, while an ignition voltage of approximately 20 kV is necessary for the hot reignition of the same high-pressure discharge lamp, that is to say for ignition in the still hot state. After ignition, the operating voltage of the high-pressure discharge lamp, that is to say that voltage drop across the discharge path which is necessary to maintain the arc discharge, is only about 80 V to 100 V.

PRIOR ART

European Patent Specification EP 0 294 604 discloses a circuit arrangement for operating a high-pressure discharge lamp from a low-voltage voltage source, in particular for operating a 35 W high-pressure halogen metal-vapour discharge lamp from the 12 V on-board electrical system of a motor vehicle. This circuit arrangement has a self-starting push-pull converter, which is equipped with two alternately switching power transistors and two transformers. One transformer is a component part of the driving apparatus for the power transistors, while the other transformer serves to transmit the medium-frequency oscillation of the push-pull converter to a series resonant circuit. The high-pressure discharge lamp or the discharge path of the high-pressure discharge lamp is connected into a parallel circuit with the resonance capacitor of the series resonant circuit. The primary winding of the transformer belonging to the driving apparatus is connected in series with the secondary winding of the transformer supplying the series resonant circuit, in order to enable matching of the driving of the push-pull converter to the lamp to be operated. Furthermore, the circuit arrangement has an apparatus for changing the time constants of the control circuits of the push-pull converter in order, on the one hand, to ensure stabilization of the lamp power in the event of changes in the operating voltage and, on the other hand, to provide an increased starting current during the firing phase of the high-pressure discharge lamp. In order to ignite the high-pressure discharge lamp, a sinusoidal AC voltage having a frequency of 45 kHz and an amplitude of up to approximately 18 kV is generated by means of a resonance increase at the resonance capacitor of the series resonant circuit, which AC voltage ignites the lamp within a time interval of 6 ms.

U.S. Pat. No. 5,036,256 describes a circuit arrangement for a high-pressure discharge lamp which can be used for example in a motor vehicle headlight. This circuit arrangement has a push-pull converter which is fed by a low-voltage voltage source and has two switching transistors and one transformer. The transformer of the push-pull converter transmits the high-frequency output voltage thereof into the load circuit into which the high-pressure discharge lamp is connected. The frequency of this output voltage is approximately 20 kHz. The high-frequency induced voltage across the secondary winding of the transformer of the push-pull converter is converted by means of a bridge rectifier into a DC voltage for the DC operation of the high-pressure discharge lamp. In order to ignite the high-pressure discharge lamp, the circuit arrangement has a pulse ignition apparatus, which has a spark gap, a pulse energy storing capacitor and a pulse transformer and generates ignition voltage pulses of up to 30 kV at the main electrodes, across the discharge path of the high-pressure discharge lamp. The secondary windings of the pulse transformer are connected in series with the discharge path of the high-pressure discharge lamp, with the result that the entire operating current flows through the secondary windings of the pulse transformer after an ignition of the lamp. In order to provide the transfer energy required for a reliable transition from the glow discharge to the arc discharge, the circuit arrangement disclosed in this US patent furthermore has a voltage multiplier comprising a plurality of diodes and capacitors, a storage capacitor being connected downstream of the said voltage multiplier.

DESCRIPTION OF THE INVENTION

The object of the invention is to provide an improved circuit arrangement for operating a high-pressure discharge lamp. In particular, it is intended that the circuit arrangement will enable the flicker-free operation of a high-pressure discharge lamp used in a motor vehicle headlight and ensure reliable cold and hot ignition of this lamp as well as a fast and reliable transition from the glow discharge to the arc discharge.

This object is achieved according to the invention by means of the characterizing features of Patent claim 1. Particularly advantageous designs of the invention are described in the subclaims.

The circuit arrangement according to the invention has a voltage converter, which generates an AC voltage, a transformer which is connected to the voltage converter and transmits the AC voltage generated by the voltage converter into the load circuit, constructed as a series resonant circuit, for the high-pressure discharge lamp, and a pulse ignition apparatus for the high-pressure discharge lamp. According to the invention, the transformer connected to the voltage converter, has at least two secondary windings, the first secondary winding being connected into the load circuit constructed as series resonant circuit and the second secondary winding being connected to the voltage input of the pulse ignition apparatus. The ignition voltage output of the pulse ignition apparatus is provided for connection to an auxiliary ignition electrode of the high-pressure discharge lamp to be operated. The voltage supply of the pulse ignition apparatus and of the load circuit by two secondary windings of the transformer connected to the voltage converter permits a decoupling of the ignition apparatus from the load circuit into which the series resonant circuit and the high-pressure discharge lamp are connected, with the result that the operating current of the high-pressure discharge lamp does not have to flow through the ignition apparatus after the ignition of the lamp. This makes it possible to design the ignition apparatus significantly more compactly, since the components of the ignition apparatus do not have to withstand the comparatively high current intensity of the operating current during the starting phase and during the lit operation of the lamp. During the ignition phase and during the subsequent starting phase of the high-pressure discharge lamp, the transfer energy required for the transition from the glow discharge to the arc discharge is provided for the high-pressure discharge lamp with the aid of the series resonant circuit by means of the method of resonant increase at the resonance capacitor. The decoupling of the ignition apparatus and the load circuit in the manner according to the invention as explained above is particularly advantageous in the case of circuit arrangements for high-pressure discharge lamps used in motor vehicle headlights, because a particularly high current is applied to these lamps during their starting phase, in order to shorten the starting phase. The term starting phase in this case designates the time interval from the ignition of the lamp until the reaching of a quasi-steady operating state in which a stable arc discharge has formed in the lamp. For a high-pressure halogen metal-vapour discharge lamp with an electrical power consumption of approximately 35 W, as is customarily used in motor vehicle headlights, a resonant-increased, medium-frequency AC voltage having voltage amplitudes between 500 V and 1500 V is advantageously provided at the resonance capacitor during the ignition and starting phases for the transition from the glow discharge to the arc discharge.

The voltage converter that is advantageously used is a push-pull converter having two switching transistors which, together with the transformer connected to its output, enables operation of the high-pressure discharge lamp from a low-voltage voltage source, which is particularly important for applications of the high-pressure discharge lamp in motor vehicle headlights. With the aid of the push-pull converter and the transformer, the low voltage, for example the supply voltage of an on-board electrical system of a motor vehicle, which is typically a 12 V or 24 V DC voltage, is stepped up to a medium-frequency AC voltage having a voltage amplitude of approximately 500 V on the secondary side of the transformer. The frequency of this AC voltage is advantageously more than 200 kHz and preferably lies between 500 kHz and 3 MHz. A specially flicker-free operation is possible in this preferred frequency range, particularly for low-wattage high-pressure discharge lamps as are used in motor vehicles. In addition, in this frequency range, sufficient radio interference suppression of the circuit arrangement can still be ensured with tenable means.

The transformer connected to the push-pull converter has two primary windings through which the supply current flows alternately in the switching cycle of the push-pull converter. A capacitor is advantageously connected in parallel with the primary windings of this transformer and forms a resonant circuit with the primary windings of the transformer. The capacitance of this capacitor is advantageously coordinated with the inductance of the transformer in such a way that a sinusoidal voltage is produced across this capacitor at a high switching frequency of the push-pull converter. As a result, the switching losses at the transistors of the push-pull converter can be considerably reduced.

In order to avoid interference of the lamp operation due to the occurrence of longitudinal acoustic resonances in the discharge medium, a frequency modulation of the AC voltage, generated by the voltage converter, for the high-pressure discharge lamp is advantageously carried out. The centre or carrier frequency of the frequency-modulated AC voltage is advantageously more than 300 kHz and preferably lies between 500 kHz and 2.9 MHz. The frequency deviation is advantageously 10 kHz to 100 kHz and the modulation frequency advantageously lies between 100 Hz and 5 kHz.

The illumination system according to the invention comprises a high-pressure discharge lamp and the associated operating device, the operating device containing a circuit arrangment having a voltage converter which generates an AC voltage, a transformer which is connected to the voltage converter and transmits the AC voltage generated by the voltage converter into the load circuit for the high-pressure discharge lamp, a pulse ignition apparatus for the high-pressure discharge lamp and a series resonant circuit whose resonance capacitor is connected in parallel with the discharge path of the high-pressure discharge lamp. The transformer connected to the voltage converter has at least two secondary windings, the first secondary winding being connected to the series resonant circuit and the second secondary winding being connected to the voltage input of the pulse ignition apparatus.

The high-pressure discharge lamp belonging to the illumination system according to the invention has, in addition to the electrodes arranged inside its discharge vessel, an auxiliary ignition electrode, which is connected to the ignition voltage output of the pulse ignition apparatus and has high-voltage pulses appled to it for the purpose of igniting the high-pressure discharge lamp. The auxiliary ignition electrode is advantageously situated outside the discharge vessel, with the result that the ignition pulses are coupled capacitively into the lamp. The auxiliary ignition electrode advantageously comprises an electrically conductive layer, which is applied to a lamp vessel, preferably to the outer bulb, surrounding the discharge vessel of the high-pressure discharge lamp. In the case of high-pressure discharge lamps used in motor vehicle headlights, this electrically conductive layer is, advantageously, additionally constructed as an optical aperture for producing the dipped beam.

Figure 2:
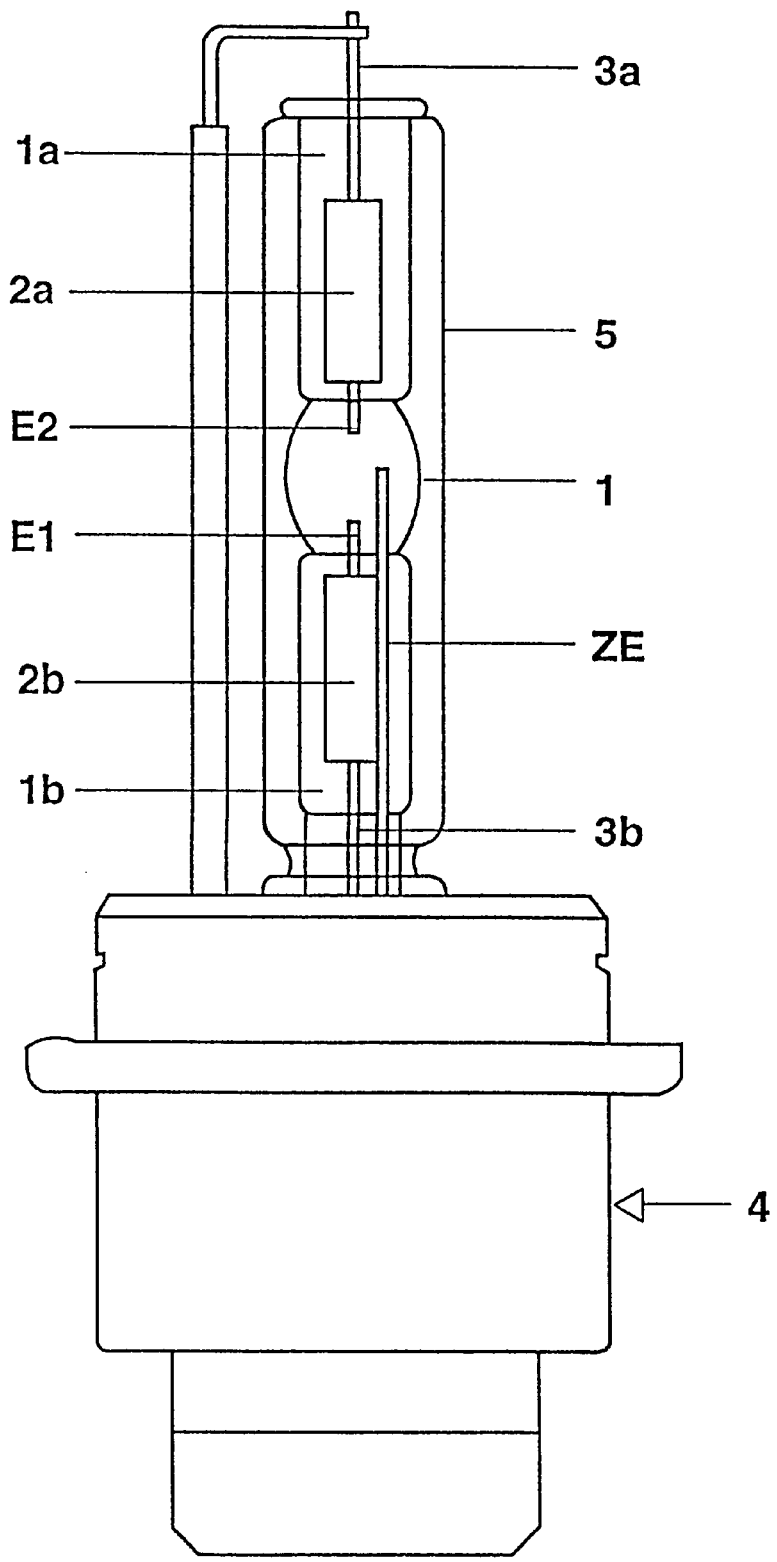
Figure 3:
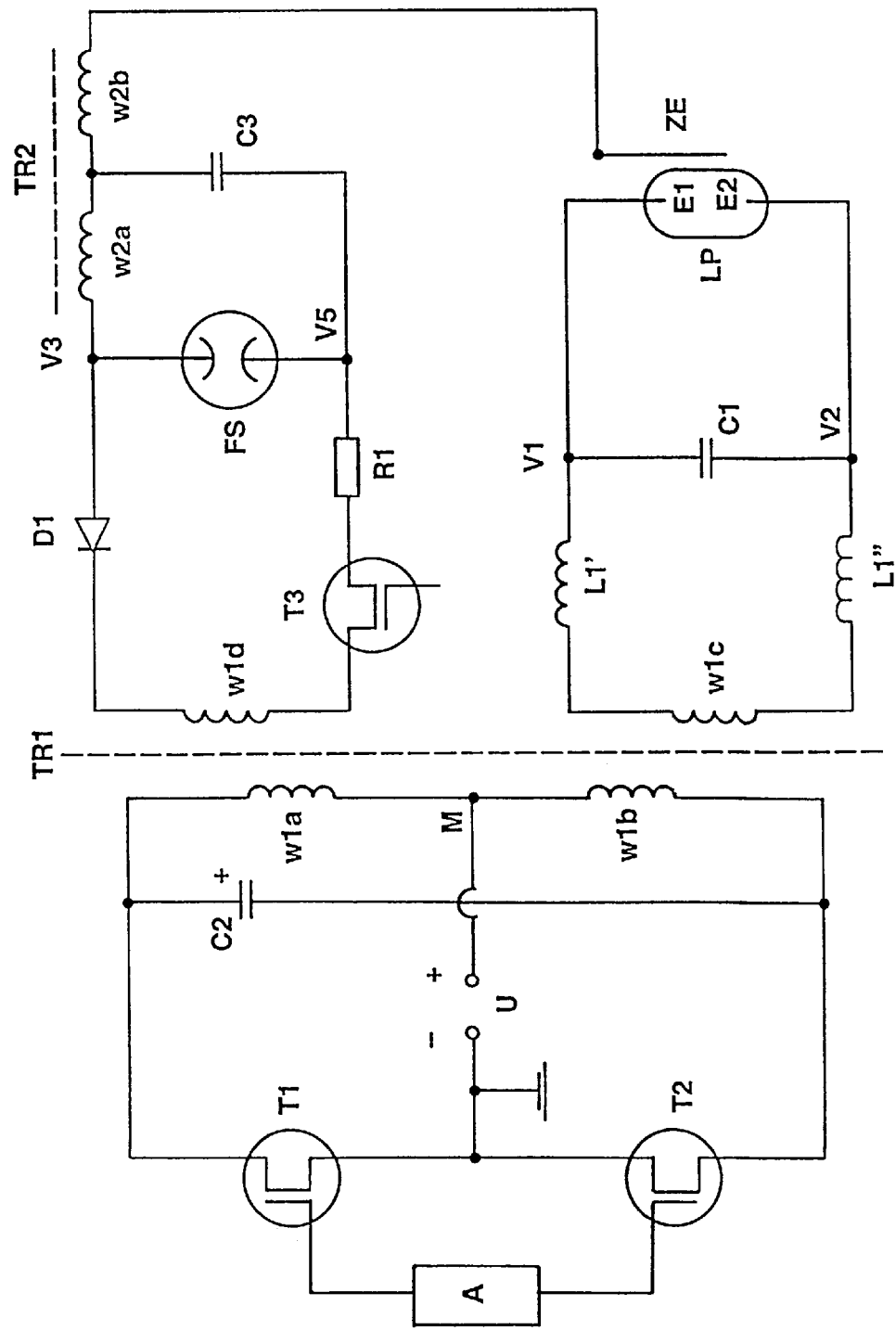

The invention is explained in more detail below using two preferred exemplary embodiments. In the figures:

FIG. 1 shows a diagrammatic illustration of the circuit arrangement according to the invention FIG. 2 shows a side view of a high-pressure discharge lamp with an auxiliary ignition electrode for operation from the circuit arangement according to the invention, in a diagrammatic illustration FIG. 3 shows a diagrammatic illustration of the circuit arrangement according to a second exemplary embodiment

PREFERRED EXEMPLARY EMBODIMENTS

FIG. 1 diagrammatically shows the circuit principle of the circuit arrangement according to the invention for operating a high-pressure halogen metal-vapor discharge lamp with an electrical power consumption of approximately 35 W. This circuit arrangement has a push-pull converter, which is fed by a 12 V Dc voltage source U at its input, and a load circuit, into which the high-pressure discharge lamp to be operated is connected, as well as a pulse ignition apparatus for the high-pressure discharge lamp.

The push-pull converter is essentially formed by two field-effect transistors T1, T2, their driving apparatus A and a transformer TR1 having two primary windings w1a, w1b and two secondary windings w1c, w1d. The earthed negative pole of the DC voltage source U is connected to the source terminals of the two field-effect transistors T1, T2. The positive pole of the DC voltage source U is connected, via a centre tap M, on the one hand to a first connection of the first primary winding w1a of the transformer TR1 and on the other hand to a first connection of the second primary winding w1b of the transformer TR1. The second connection of the first primary winding w1a is connected to the drain terminal of the first field-effect transistor T1 and the second connection of the second primary winding w1b is connected to the drain terminal of the second field-effect transistor T2. The first secondary winding w1c is connected into the load circuit, while the second secondary winding w1d of the transformer TR1 is connected to the ignition apparatus.

The load circuit contains, in addition to the secondary winding w1c, a resonance inductor L1, a resonance capacitor C1 and two terminals for the high-pressure discharge lamp LP to be operated. The resonance inductor L1 and the resonance capacitor C1 form a series resonant circuit, which is supplied with a medium frequency AC voltage from the secondary winding w1c of the transformer TR1. The high-pressure halogen metal-vapour discharge lamp LP is connected to the load circuit in such a way that the discharge path defined by its main electrodes E1, E2 is connected in parallel with the resonance capacitor C1. One connection of the first secondary winding w1c is connected via the resonance inductor L1 and the junction point V1 to a terminal of the resonance capacitor C1 and to the electrode E1 of the high-pressure discharge lamp LP. The other connection of the first secondary winding w1c is connected via the junction point V2 to the other terminal of the resonance capacitor C1 and to the electrode E2 of the high-pressure discharge lamp LP.

The pulse ignition apparatus is formed by a spark gap FS, a pulse energy storing capacitor C3, a pulse transformer TR2, a rectifier diode D1, a non-reactive resistor R1, a field-effect transistor T3 and the second secondary winding w1d of the transformer TR1. A first connection of the second secondary winding w1d is connected to the cathode of the rectifier diode D1. The anode of the rectifier diode D1 is connected via the junction point V3 to a first terminal of the spark gap FS and to a first connection of the primary winding w2a of the pulse transformer TR2. The second connection of the primary winding w2a is connected via the junction point v4 to a first connection of the secondary winding w2b of the pulse transformer TR2 and to a terminal of the pulse energy storing capacitor C3. The other terminal of the pulse energy storing capacitor C3 is connected via the junction point V5 to the second terminal of the spark gap FS and to the non-reactive resistor R1. The junction point V5 is at the same electrical potential as the junction point V2. The non-reactive resistor R1 is connected via the source-drain path of the field-effect transistor T3 to the second connection of the second secondary winding w1d of the transformer TR1. The second connection of the secondary winding w2b of the pulse transformer TR2 forms the ignition voltage output of the pulse ignition apparatus. It is connected to the auxiliary ignition electrode ZE of the high-pressure discharge lamp LP.

The high-pressure discharge lamp LP represented in FIG. 2 is a high-pressure halogen metal-vapour discharge lamp LP with a base at one end and having an electrical power consumption of approximately 35 W. It forms, together with an operating device which is coordinated with it and has the circuit arrangement according to the invention as illustrated in FIG. 1, an illumination system which can be used for a motor vehicle headlight. The lamp LP has a discharge vessel 1 made of quartz glass, in which an ionizable filling is enclosed in a gas-tight manner. The ionizable filling contains xenon and metal halide compounds. The two ends 1a, 1b of the discharge vessel 1 are respectively sealed by means of a molybdenum foil seal 2a, 2b. Two electrodes E1, E2, between which the discharge arc which is responsible for light emission forms during operation of the lamp, are situated in the interior of the discharge vessel 1. These main electrodes E1, E2 are electrically conductively connected, via one of the molybdenum foil seals 2a, 2b in each case, to a power supply lead 3a, 3b of the lamp base 4. The discharge vessel 1 is encapsulated by an outer glass bulb 5. A detailed description of the construction of this lamp LP is revealed in the published patent application EP 0 696 046, for example. In this exemplary embodiment of the invention, the auxiliary ignition electrode ZE is formed here by a thin metallic coating on the outer surface of the outer bulb 5. The thin metallic coating ZE has the form of an elongate strip which extends from that end of the outer bulb 5 which is near to the base approximately as far as the level of the centre point of the discharge vessel, with the result that that end of the auxiliary ignition electrode ZE which is remote from the base is approximately the same distance away from both electrodes E1, E2.

The field-effect transistors T1, T2 driven by the driving apparatus A switch alternately at a switching frequency of about 800 kHz, with the result that—without taking account of the capacitor C2—the two primary windings w1a, w1b of the transformer TR1 are alternately connected to the 12 V DC voltage source U. An alternating current whose frequency corresponds to the switching frequency of the push-pull converter therefore flows through the primary windings w1a, w1b. The capacitance of the capacitor C2 is coordinated with the inductance of the primary windings w1a, w1b in such a way that the primary windings w1a, w1b and the capacitor C2 form a resonant circuit at the switching frequency of the push-pull converter T1, T2, with the aid of which resonant circuit the switching losses occurring in the field-effect transistors T1, T2 are reduced. The voltage drop across the capacitor C2 is virtually sinusoidal. The voltage profile at the primary windings w1a, w1b in each case describes a sinusoidal half-cycle whose peak value is about 24 V on account of the resonant increase. The two primary windings w1a, w1b are inductively coupled to the two secondary windings w1c, w1d of the transformer TR1. The primary windings w1a, w1b each have three turns and the secondary windings w1c, w1d each have forty turns, with the result that the AC voltage generated by the push-pull converter T1, T2 is transmitted with a turns ratio of approximately 13:1 by means of the first secondary winding w1c into the load circuit and by means of the second secondary winding w1d into the pulse ignition apparatus. The peak voltages induced in the secondary windings w1c, w1d are about 500 V. The frequencies of the induced voltages in the load circuit and in the ignition apparatus correspond to the frequency of the AC voltage generated by the push-pull converter T1, T2.

In order to ignite the high-pressure halogen metal-vapour discharge lamp LP, the pulse ignition apparatus is activated by means of the switching transistor T3. For this purpose, the gate of the field-effect transistor T3 is driven by an integrated circuit (not illustrated), in particular a timer circuit. When the transistor T3 is switched on, the pulse energy storing capacitor C3 is charged via the rectifier diode D1 and the primary winding w2a of the pulse transformer TR2, in order to be discharged again in a pulsating manner each time the breakdown voltage of the spark gap FS is reached. The pulsating discharge currents of the capacitor C3 flow through the primary winding w2a of the pulse transformer TR2 and are converted by the secondary winding w2b into high-voltage pulses which are fed to the auxiliary ignition electrode ZE of the high-pressure halogen metal-vapour discharge lamp LP and coupled capacitively to the lamp LP. These high-voltage ignition pulses transmitted from the secondary winding w2b to the auxiliary ignition electrode ZE are unipolar and have a positive polarity in this exemplary embodiment. They reach peak values of approximately 30 kV. Since the pulse energy storing capacitor C3 and the primary winding w2a are constructed as a resonant circuit, upon each discharge of the capacitor C3 not just one ignition voltage pulse is generated, but rather a whole cascade of high-voltage pulses is released for the auxiliary ignition electrode ZE.

The first secondary winding w1c of the transformer TR1 supplies the load circuit, which contains the resonant circuit components L1, C1 and terminals for the high-pressure discharge lamp LP, with an input voltage of approximately 500 V. A resonant increase in this input voltage of approximately 500 V to 1500 V is achieved by means of the series resonant circuit L1, C1. The energy stored in the resonant circuit L1, C1 is made available to the lamp LP immediately after its ignition as transfer energy for ensuring fast starting of the lamp, and, in particular, a fast transition from the glow discharge to the arc discharge. The resonant circuit components C1, L1 are dimensioned in such a way that the available transfer energy is optimally coordinated with the lamp LP to be operated. In the exemplary embodiment of a 35 W high-pressure halogen metal-vapour discharge lamp that is explained here, the resonance capacitor C1 has a capacitance of 330 pF and the resonance inductor L1 has an inductance of 50 $\mu$H, resulting in a resonant frequency of 1.2 MHz for the series resonant circuit L1, C1. The supply voltage of the lamp LP, that is to say the voltage drop across its electrodes E1, E2, is frequency-modulated as early as during the ignition and starting phases of the said lamp. The carrier frequency and the frequency deviation as well as the modulation frequency are chosen such that the available transfer energy is optimally coordinated with the lamp LP to be operated.

After the end of the ignition and starting phases of the high-pressure halogen metal-vapour discharge lamp LP, the lamp is operated with a frequency-modulated AC voltage. The carrier frequency or centre frequency of this frequency-modulated AC voltage is approximately 800 kHz and the frequency deviation is about 100 kHz, with the result that the frequency of the lamp operating voltage varies periodically between 700 kHz and 900 kHz. The modulation frequency is approximately 1.5 kHz. The modulation signal has a triangular wave form. A flicker-free stable discharge arc is achieved by the modulation.

The frequency modulation of the AC voltage is carried out with the aid of a frequency generator (not illustrated) belonging to the driving apparatus A. Since the driving apparatus A is not essential to an understanding of the present invention, it will not be explained in greater detail here. The driving apparatus can be realized for example with the aid of an integrated circuit whose output is connected to the gate terminals of the field-effect transistors T1, T2 and which controls the timing of all the processes in the entire circuit arrangement. In addition, the driving apparatus A usually enables power regulation of the lamp LP by means of pulse width modulation of the control signal for the field-effect transistors T1, T2 of the push-pull converter. However, the driving apparatus A can also be implemented with the aid of an additional transformer, as is disclosed for example in European Patent Applications EP 0 294 604 and EP 0 294 605.

FIG. 3 shows a second exemplary embodiment of the circuit arrangement according to the invention. This second exemplary embodiment is distinguished from the first exemplary embodiment only by the resonance inductor arranged in the load circuit which, in the second exemplary embodiment, is formed by two inductors L1', L1" of equal size. The same reference characters have therefore been chosen for identical components in FIGS. 1 and 3. In the second exemplary embodiment the components L1', L1", C1 of the series resonant circuit are arranged symmetrically with respect to the lamp electrodes E1, E2. That is, a first terminal of the first resonance inductance L1' is connected to a first connection of the first secondary winding w1c of the transformer TR1, whereas its second connection is connected via the junction point V1 to the first lamp electrode E1 and to a first terminal of the resonance capacitor C1. Analogously, the first terminal of the second resonance inductor L1" is connected to the second connection of the first secondary winding w1c and its second connection is connected via the junction point V2 to the second lamp electrode E2 and to the second terminal of the resonance capacitor C1. As a result the energy stored in the series resonant circuit L1', L1", C1 is coupled symmetrically into the high-pressure discharge lamp LP via both lamp electrodes E1, E2, especially during the starting phase of the high-pressure discharge lamp in which the transfer from the glow discharge to the arc discharge takes place. In all other parts the construction and functioning of the second exemplary embodiment are identical with the construction and functioning of the first exemplary embodiment.

The invention is not restricted to the exemplary embodiment described in detail above. For example, a radio-frequency filter may additionally be connected between the low-voltage voltage source U and the input of the push-pull converter, which filter effects radio interference suppression of the circuit arrangement according to the invention and considerably reduces the perturbative feedback of the high- or medium-frequency oscillation, generated by the push-pull converter, on the voltage source. Furthermore, it is also possible to use a different voltage converter instead of a push-pull converter. Instead of a spark gap, the ignition apparatus can also have a different automatic switch, for example a four-layer diode, a triac or another semiconductor component designed as a threshold value switch. In addition, the switching transister T3 of the ignition apparatus can also be replaced by a relay.

Alternatively, it is possible to connect the transistor T3 into the ignition apparatus between the diode D1 and the junction point V3 and at the same time polarize the diode D1 in such a way that its anode is connected to the secondary winding w1d and its cathode is connected to the drain terminal of the transistor T3. The junction point V5 is then connected to the secondary winding w1d via the resistor R1.

Various embodiments are likewise possible for the auxiliary ignition electrode ZE of the high-pressure discharge lamp. For example, the auxiliary ignition electrode can also be constructed as a thin metallic coating on the inside of the outer bulb or on the outside of the discharge vessel. Furthermore, the strip-like auxiliary ignition electrode ZE, illustrated in FIG. 2, on the outside of the outer bulb can also be widened and shaped in such a way that it can also simultaneously serve as an optical aperture or shading means for producing the dipped beam. Finally, it is also possible to produce the auxiliary ignition electrode from a wire which extends parallel to the longitudinal axis of the lamp inside or outside the outer bulb, or which is looped around the discharge vessel.

In principle, the illumination system comprising the high-pressure discharge lamp LP and the circuit arrange ment according to the invention does not necessarily have to be a component part of a motor vehicle headlight. It can also be utilized for other applications, for example for projectors or other photo-optical applications. In this case, the supply voltage U does not originate from the on-board electrical system of a motor vehicle. The supply voltage U may then also be the rectified AC voltage of an AC voltage source.

We claim:

1. Circuit arrangement for operating a high-pressure discharge lamp for an extended period of time, comprising:
    a voltage converter (T1, T2), which generates an AC voltage,
    a transformer (TR1), which is connected to the voltage converter (T1, T2,),
    a pulse ignition apparatus for the high-pressure discharge lamp, the pulse ignition apparatus having a voltage input and an ignition voltage output,
    a load circuit, which is constructed as a series resonant circuit, and into which the high-pressure discharge lamp (LP) is connected and which contains at least one resonant inductor (L1) and at least one resonant capacitor (C1),
    the transformer (TR1) has at least two secondary windings (w1c, w1d), the first secondary winding (w1c) being connected into the load circuit and the second secondary winding (w1d) being connected to the voltage input of the pulse ignition apparatus, the load circuit being decoupled from the pulse ignition apparatus, and
    the ignition voltage output of the pulse ignition apparatus is provided for connection to an auxiliary ignition electrode (ZE) of the high-pressure discharge lamp (LP).

2. Circuit arrangement according to claim 1, characterized in that the frequency of the AC voltage generated by the voltage converter (T1, T2) is greater than 200 kHz.

3. Circuit arrangement according to claim 2, characterized in that the frequency of the AC voltage generated by the voltage converter (T1, T2) lies between 500 kHz and 3 MHz.

4. Circuit arrangement according to claim 1, characterized in that the resonant frequency of the non-loaded series resonant circuit is greater than 200 kHz.

5. Circuit arrangement according to claim 4, characterized in that the resonant frequency of the non-loaded series resonant circuit lies between 500 kHz and 3 MHz.

6. Circuit arrangement according to claim 1, characterized in that the pulse ignition apparatus contains a pulse energy storing capacitor (C3), a pulse transformer (TR2) and an automatic switch (FS).

7. Circuit arrangement according to claim 6, characterized in that the automatic switch (FS) is a spark gap.

8. Circuit arrangement according to claim 6, characterized in that the automatic switch is a semiconductor component designed as a threshold value switch.

9. Circuit arrangement according to claim 1, characterized in that the ignition apparatus contains a rectifier (D1).

10. Circuit arrangement according to claim 1, characterized in that the voltage converter (T1, T2) is a push-pull converter.

11. Circuit arrangement according to claim 10, characterized in that
    the push-pull converter has two switching transistors (T1, T2),
    the transformer (TR1) of the push-pull converter (T1, T2) has two primary windings (w1a, w1b) each having two connections,
    the first connection of the first primary winding is connected via a centre tap (M) to the first connection of the second primary winding (w1b),
    the second connection of the first primary winding (w1a) is connected to the first switching transistor (T1),
    the centre tap is provided for connection to the positive pole of a DC voltage supply (U),
    the second connection of the second primary winding (w1b) is connected to the second switching transistor (T2),
    the push-pull converter (T1, T2) has at least one resonance capacitor (C2), one terminal of the at least one resonance capacitor (C2) being connected to the first connection of the first primary winding (w1a) and the other terminal of the at least one resonance capacitor (C2) being connected to the second connection of the second primary winding (w1b).

12. Illumination system having a high-pressure discharge lamp and an operating device for the high-pressure discharge lamp, the operating device containing a circuit arrangement according to claim 1, and the high-pressure discharge lamp having a discharge vessel with electrodes arranged therein, a gas discharge forming between the said electrodes during operation of the lamp, characterized in that the high-pressure discharge lamp (LP) has an auxiliary ignition electrode (ZE) which is electrically conductively connected to the ignition voltage output of the pulse ignition apparatus.

13. Illumination system according to claim 12, characterized in that the auxiliary ignition electrode (ZE) is arranged outside the discharge vessel.

14. Illumination system according to claim 12, characterized in that the auxiliary ignition electrode (ZE) is formed by an electrically conductive layer which is applied to a lamp vessel of the high-pressure discharge lamp (LP).

15. Illumination system according to claim 14, characterized in that the high-pressure discharge lamp has a discharge vessel and an outer bulb, which encloses the discharge vessel completely or partially, and in that the lamp vessel is the outer bulb.

16. Illumination system according to claim 14, characterized in that the electrically conductive layer is designed as an optical aperture.

17. Illumination system according to claim 12, characterized in that the high-pressure discharge lamp is a high-pressure halogen metal-vapour discharge lamp with an electrical power consumption of less than or equal to 100 W.

18. Operating method for an illumination system according to claim 12, characterized in that high-voltage pulses are applied to the auxiliary ignition electrode (ZE) of the high-pressure discharge lamp (LP) in order to ignite the high-pressure discharge lamp (LP), during the ignition phase of the high-pressure discharge lamp (LP) and during the subsequent transition phase from the glowdischarge to the arc discharge, an AC voltage generated by means of a resonant increase is provided for the high-pressure discharge lamp (LP) across the resonance capacitor (C1) of a series resonant circuit (L1, C1).

19. Operating method according to claim 18, characterized in that the frequency of the AC voltage is greater than 200 kHz.

20. Operating method according to claim 18, characterized in that the frequency of the AC voltage is greater than 500 kHz.

21. Operating method according to claim 18, characterized in that the high-pressure discharge lamp (LP) is a high-pressure halogen metal-vapour discharge lamp with a rated power of less than or equal to 100 W, and the amplitude of the AC voltage generated across the resonance capacitor (C1) of the series resonant circuit (L1, C1) by means of a resonant increase is between 500 V and 1.5 kV.

22. Operating method according to claim 18, characterized in that the high-pressure discharge lamp is operated with a frequency-modulated AC voltage after the end of the transition phase from the glow discharge to the arc discharge.

23. Operating method according to claim 22, characterized in that the carrier frequency of the frequency-modulated AC voltage is greater than 300 kHz.

24. Operating method according to claim 23, characterized in that the carrier frequency of the frequency-modulated AC voltage is between 500 kHz and 2.9 MHz.

25. Operating method according to claim 22, characterized in that the frequency deviation of the frequency-modulated AC voltage is from 10 kHz to 100 kHz.

26. Operating method according to claim 22, characterized in that the modulation frequency of the AC voltage is from 100 Hz to 5 kHz.

27. Operating method according to claim 18, characterized in that the circuit arrangement is supplied by a low-voltage voltage source.

28. Operating method according to claim 27, characterized in that the low-voltage voltage source is a DC voltage source.

29. Operating method according to claim 28, characterized in that the DC voltage source is a motor vehicle battery.

30. Operating method according to claim 27, characterized in that the supply voltage of the low-voltage voltage source is less than 50 V.

* * * * *